United States Patent
Song et al.

(10) Patent No.: US 11,051,220 B1
(45) Date of Patent: Jun. 29, 2021

(54) PERFORMING MU-MIMO IN WIRELESS NETWORKS UTILIZING DIFFERENT BANDWIDTH PARTS

(71) Applicant: Sprint Spectrum LP, Overland Park, KS (US)

(72) Inventors: Minho Song, Ashburn, VA (US); Hadeel Fayad, Washington, DC (US); Sanghoon Sung, Ashburn, VA (US); Yun Sung Kim, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 16/598,445

(22) Filed: Oct. 10, 2019

(51) Int. Cl.
| | |
|---|---|
| *H04B 7/0452* | (2017.01) |
| *H04W 36/06* | (2009.01) |
| *H04W 36/00* | (2009.01) |
| *H04W 72/04* | (2009.01) |
| *H04W 8/24* | (2009.01) |
| *H04W 72/00* | (2009.01) |
| *H04L 5/00* | (2006.01) |

(52) U.S. Cl.
CPC .......... *H04W 36/06* (2013.01); *H04B 7/0452* (2013.01); *H04L 5/0092* (2013.01); *H04W 8/245* (2013.01); *H04W 36/0007* (2018.08); *H04W 72/005* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2006/0035639 A1* | 2/2006 | Etemad | H04W 36/18 455/436 |
| 2018/0092102 A1* | 3/2018 | Pefkianakis | H04B 7/0452 |
| 2019/0103954 A1 | 4/2019 | Lee et al. | |
| 2019/0104554 A1 | 4/2019 | Amuru et al. | |
| 2020/0053811 A1* | 2/2020 | Ang | H04W 76/18 |

* cited by examiner

*Primary Examiner* — Ayanah S George

(57) ABSTRACT

Selecting a first BWP for a first carrier deployed by an access node based on requirements of wireless devices attached to the first carrier, selecting a second BWP for a second carrier deployed by the access node based on requirements of wireless devices attached to the second carrier, monitoring a MU-MIMO performance for each carrier, and performing handovers of wireless devices between the first and second carriers based on the MU-MIMO performance.

20 Claims, 7 Drawing Sheets

PERFORMING MU-MIMO IN WIRELESS NETWORKS UTILIZING DIFFERENT BANDWIDTH PARTS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a multi-user (MU-MIMO) mode, in which multiple data streams can be directed towards a plurality of wireless devices that are selected to participate in the MU-MIMO operating mode based on the orthogonality of transmission, thereby maximizing resources. MIMO has been identified as one of the promising air interface technologies to address the capacity requirement required demanded by 5G networks. Further, 5G networks are capable of deploying wireless air interfaces with bandwidh parts (BWPs) that include contiguous blocks of resources, each contiguous block being configured with its own numerology and subcarrier spacing. For example, different BWPs can be configured for different types of signals (such as narrowband internet-of-things, wideband voice or data, etc.) or for wireless devices having different application requirements (such as voice over IP, gaming, streaming, etc.). Wireless devices with different bandwidth requirements can access different BWPs for their needs.

However, indiscriminately activating MU-MIMO for increasing numbers of wireless devices that utilize differently-sized BWPs can result in inefficiencies in the wireless network. For example, while MU-MIMO increases spectrum utilization by reusing the same frequency and time resources for multiple wireless devices that are paired, the increase is minimized when the paired wireless devices have different bandwidth requirements. For example, pairing a first wireless device using a 20 MHz BWP with a second wireless device using a 5 MHz BWP (with both BWPs sharing overlapping resources) does not efficiently reuse the resources. Further, the increase of different BWPs supporting different bandwidth sizes per wireless device provides challenges when performing MU-MIMO for these wireless devices.

Overview

Exemplary embodiments described herein include methods, systems, and processing nodes for performing MU-MIMO in wireless networks utilizing different BWPs. An exemplary method for performing MU-MIMO in wireless networks utilizing different BWPs includes selecting a first BWP for a first carrier deployed by a wireless network, and performing MU-MIMO for wireless devices attached to the first carrier and utilizing the first BWP, wherein the performing MU-MIMO comprises forming MU-MIMO groups comprising eligible wireless devices from among the wireless devices attached to the first carrier and utilizing the first BWP.

An exemplary system for performing MU-MIMO in wireless networks utilizing different BWPs includes a processing node, and a processor coupled to the processing node. The processor can be configured to perform operations including selecting a first BWP for a first carrier deployed by an access node based on any combination of characteristics of the access node and wireless devices attached to the first carrier, selecting a second BWP for a second carrier deployed by the access node based on any combination of the characteristics of the access node and wireless devices attached to the second carrier, monitoring a MU-MIMO performance for wireless devices attached to the first carrier and utilizing the first BWP and for wireless devices attached to the second carrier and utilizing the second BWP, and performing handovers of wireless devices between the first and second carriers based on the MU-MIMO performance.

An exemplary processing node for performing MU-MIMO in wireless networks utilizing different BWPs is configured to perform operations including identifying a first plurality of wireless devices attached to a first carrier as having a common bandwidth requirement, creating a bandwidth part (BWP) within the first carrier, wherein a size of the BWP is selected based on the common bandwidth requirement, and forming one or more MU-MIMO groups comprising MU-MIMO eligible wireless devices within the first plurality of wireless devices.

DETAILED DESCRIPTION

In embodiments disclosed herein, a wireless network is configured to select a specific bandwidth part (BWP) to be broadcasted to wireless devices within the wireless network. When wireless devices that share a common bandwidth requirement attach to the specific BWP, the probability of forming successful MU-MIMO groups or pairings with these wireless devices is increased, thereby improving the utilization of wireless resources deployed by the wireless network. Additional wireless devices from different carriers or BWPs can request handovers to the specific BWP to maximize resource usage, and other wireless devices that do not share the common bandwidth requirement can request handovers to other carriers or BWPs that more closely match the bandwidth requirements of these other wireless devices. Thus, several successful MU-MIMO groups can be formed across different carriers with wireless devices that share common bandwidth requirements, thereby improving resource utilization across the entire wireless network. These and additional operations are further described with respect to the embodiments depicted in FIGS. 1-8 below.

Figure 1:
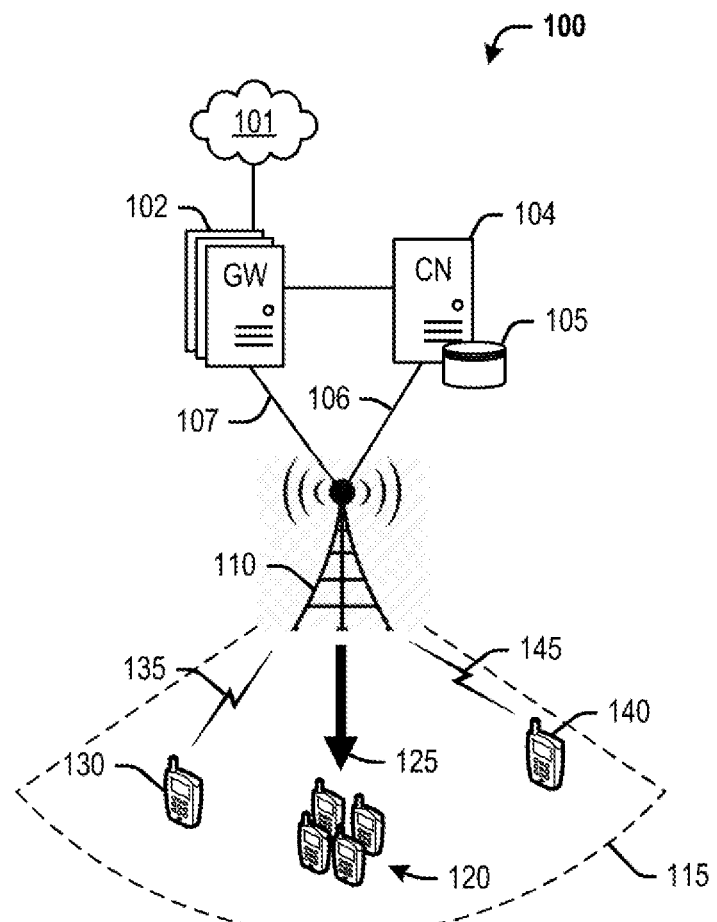
FIG. 1 depicts an exemplary system for performing MU-MIMO in a wireless network utilizing different BWPs.

FIG. 1 depicts an exemplary system 100 for performing MU-MIMO in a wireless network. System 100 comprises a communication network 101, gateway node(s) 102, controller node 104, access node 110, and wireless devices 120, 130, 140. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130, 140 are illustrated in FIG. 1, any number of access nodes and wireless devices can be implemented within system 100.

By virtue of comprising a plurality of antennae as further described herein, access node 110 can implement various transmission modes or operating modes within its coverage area, including multiple-input-multiple-output (MIMO), single user MIMO (SU-MIMO), multi-user MIMO (MU-MIMO), beamforming, etc. In an exemplary embodiment, access node 110 may utilize hundreds of antennae to simultaneously transmit each of a plurality of different data streams (such as MU-MIMO data stream 125) to a corresponding plurality of wireless devices (such as wireless devices 120). Further, access node 110 may utilize one or more antennae to set up a transmission channel 135 with wireless device 130 and transmission channel 145 with wireless device 140. For example, transmission channels 135, 145 may be deployed using a SU-MIMO operating mode. In other words, wireless devices 120 may be participating in a MU-MIMO group (or pairing), while wireless devices 130, 140 may not qualify for MU-MIMO or may not require MU-MIMO.

Qualifying for MU-MIMO may be based on, for instance, an orthogonality of transmission, so as to maximize resources of a loaded access node. In other words, one or more criteria for pairing wireless devices for MU-MIMO (or including the wireless devices into an existing MU-MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, 140, i.e., DM-RS, or specific to geographical areas of access node 110 or sector 115. DM-RS' are pre-coded signals used for demodulation purposes on scheduled PRBs. For example, a pre-coding module of access node 110 may apply pre-coding to data transmissions targeted to wireless devices 130, 140 based on channel feedback received from said wireless devices including RI, CQI, and PMI. Other non pre-coded signals can be used by wireless devices 130, 140 for channel estimation. To fully exploit MU-MIMO mode, data/spatial streams intended to/from access node 110 and/or wireless devices 120 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional precoding techniques may include Channel Inversion ("CI"), e.g., to cancel interference, and/or Regularized Channel Inversion ("RCI"), e.g., to attenuate interference. To avoid scheduling wireless devices located at, for example, a cell-edge of access node 110, into MU-MIMO mode, a predicted SINR of both the primary and candidate wireless devices at the considered PRB are compared to the set threshold.

Further, access node 110 (or any other entity within system 100) may be configured to execute a method including selecting a first bandwidth part (BWP) for a first carrier deployed by access node 110 and performing MU-MIMO for wireless devices attached to the first carrier and utilizing the first BWP. Performing MU-MIMO can include forming MU-MIMO groups (such as MU-MIMO group 120) comprising eligible wireless devices from among the wireless devices attached to the first carrier and utilizing the first BWP. For example, different wireless devices from among wireless devices 120, 130, 140 may be configured to utilize different BWPs depending on a bandwidth requirement (which can be based on device capability, application requirement, etc.), and pairing wireless devices with similar or identical bandwidth requirements can improve MU-MIMO efficiency. Thus, the creation and/or selection of BWPs to which certain wireless devices with common bandwidth requirements can attach can improve the chances of creating successful and efficient MU-MIMO pairings/groups.

Thus, in an exemplary embodiment, the first BWP for a carrier deployed by access node 110 is selected or created based on a combination of one or more requirements of the wireless devices and one or more capabilities of an access node deploying the first carrier. The one or more requirements of the wireless devices comprise bandwidth requirements, application requirements, or minimum throughput requirements, and the one or more capabilities of the access node (e.g. access node 110) comprise a number of antenna elements coupled to the access node 110, a load of the access node 110, or an operating frequency of the access node 110. For example, certain carriers deployed by the access node utilize operating frequencies selected for different applications (such as narrow bandwidth for internet of things devices, millimeter wave for data centers and other high-bandwidth applications), and an optimal or selected BWP for a carrier can be based on the operating frequency of the carrier, along with the other factors mentioned above. In either case, the selected BWP is broadcasted by the access node 110 to all wireless devices within an operating range of the first carrier. In an exemplary embodiment, the BWP is broadcast in a system information block (SIB) message, such as a SIB1 message. For example, a new attribute can be created within a SIB1 message, the new attribute indicating an identifier and a size of the BWP. In an exemplary embodiment, the new attribute comprises BWP-DownlinkPreferred and includes values for a sequence and BWP-ID.

Based on the broadcasted BWP, access node 110 can receive handover requests from any of wireless devices 120, 130, 140 to attach to the identified BWP in the broadcast. In exemplary embodiments, the wireless devices requesting handovers to the identified BWP can include wireless devices attached to a second carrier and able to receive the broadcast on the first carrier. For example, such wireless devices (on any carrier) can have a bandwidth requirement that matches a size of the BWP and, therefore, can request to attach to the BWP. As described herein, such wireless devices can be added to the BWP and, if they meet eligibility criteria for MU-MIMO, can join or form new MU-MIMO groups. The eligibility criteria can include, for example, orthogonality of the wireless devices 120, 130, 140 based on an average signal separation, a size of the sector, an angle of arrival (of, for example, a reference signal), etc. Further, a performance of the MU-MIMO groups can be monitored, and handovers of additional wireless devices into and out of the first carrier (and/or the first BWP) performed based on the performance. Generally, the performance can be based on one or more of a size of each MU-MIMO group comprising the eligible wireless devices or a quantity of eligible wireless devices participating in the MU-MIMO groups. In an exemplary embodiment, a performance of MU-MIMO can further include a throughput of each of the one or more MU-MIMO groups in the sector, an average throughput of each MU-MIMO group or each wireless device in each MU-MIMO group, or an aggregate throughput (i.e. total throughput) of all MU-MIMO signals within the sector, as well as how many wireless devices within the sector meet an orthogonality threshold, a number of successful pairings, historical trends of the signal characteristics, and so on. For example, the historical trends may be monitored and recorded at time intervals, and the pairing efficiency metric based on the recorded historical trends. Thus, at certain time intervals, the pairing efficiency metric is monitored when adjusting the maximum number of MU-MIMO wireless devices. Generally, the performance tracks how successfully and efficiently the MU-MIMO groups are utilizing the available resources.

Based on the performance, handovers may be performed into and out of the BWP and/or the current sector. For example, a first additional wireless device attached to a second carrier and capable of utilizing the first BWP is identified, and a handover of the additional wireless device is performed from the second carrier to the first carrier, or from any other carrier/BWP into the first BWP. The first additional wireless device can be attached to the same access node (i.e. access node 110), or to a different access node (i.e. a neighboring access node, not shown), and within a coverage area of access node 110 so as to receive the broadcasted BWP and request attaching thereto. Further, identifying the first additional wireless device capable of utilizing the first BWP is based on the first additional wireless device having a bandwidth requirement that matches a size of the first BWP. Further, to improve efficiency of MU-MIMO pairings within the first BWP, any additional wireless devices attached to the first carrier or the first BWP that are not capable of utilizing the first BWP can be handed over to a different carrier or BWP. For example, these additional wireless devices may not share a bandwidth requirement that matches the first BWP. Further, these additional wireless devices may have a bandwidth requirement that matches a different BWP that is used on a different carrier and, thus, a handover of these additional wireless devices may be performed to the different carrier based on the different carrier being configured to deploy the different BWP. This bandwidth requirement may be based on an application requirement, signal type, etc. utilized by the additional wireless devices. Further, the different carrier or BWP may be deployed by the same access node (i.e. access node 110) or a different (i.e. neighboring) access node. Thus, multiple access nodes within a wireless network can communicate and perform handovers of wireless devices to maximize the numbers of wireless devices that are eligible for MU-MIMO and that share common bandwidth requirements, so as to maximize resource usage within the wireless network.

As further described herein, the method described above (and variants of said method) may be performed by any component(s) within system 100. For example, system 100 may include a processing node (not shown), and a processor coupled to the processing node. For example, the processing node may be communicatively coupled to access node 110, controller node 104, or any other network node. The processor can be configured to perform operations including selecting or creating a first BWP for a first carrier deployed by access node 110 based on any combination of characteristics of the access node 110 and wireless devices 120, 130, 140 attached to the first carrier, selecting a second BWP for a second carrier deployed by the access node 110 based on any combination of the characteristics of the access node 110 and wireless devices 120, 130, 140 attached to the second carrier, monitoring a MU-MIMO performance for wireless devices attached to the first carrier and utilizing the first BWP and for wireless devices attached to the second carrier and utilizing the second BWP, and performing handovers of wireless devices between the first and second carriers based on the MU-MIMO performance. As described above, the first and second BWPs are selected based in part on bandwidth requirements of the wireless devices attached the first and second carriers respectively, and in part on an operating frequency of the first and second carriers respectively. For example, each of the first and second BWPs are selected based on identifying a maximum number of wireless devices attached respectively to the first and second carriers and having a substantially identical bandwidth requirement, and selecting each BWP by matching a size of each BWP with the substantially identical bandwidth requirement. Further, monitoring the MU-MIMO performance for wireless devices attached to each carrier comprises determining one or both of a first number of MU-MIMO groups or a second number of eligible wireless devices participating in MU-MIMO groups in each carrier. Based thereon, a first wireless device attached to the first carrier and having a bandwidth requirement matching the second BWP is identified, and a handover is performed of the first wireless device to the second carrier. Similarly, a second wireless device attached to the second carrier and having a bandwidth requirement matching the first BWP is identified, and a handover is performed of the second wireless device to the first carrier. Further, the wireless devices 120, 130, 140 can request handovers to one of the first and second carriers based on matching the bandwidth requirements of the wireless devices with the first and second BWPs respectively.

In another exemplary embodiment, the processing node within system 100 may be configured to perform operations including identifying a first plurality of wireless devices attached to a first carrier as having a common bandwidth requirement, creating a bandwidth part (BWP) within the first carrier, wherein a size of the BWP is selected based on the common bandwidth requirement, and forming one or more MU-MIMO groups comprising MU-MIMO eligible wireless devices within the first plurality of wireless devices. The operations further comprise performing a first handover of a first wireless device attached to the first carrier and not having the common bandwidth requirement to a second carrier, and performing a second handover of a second wireless device attached to the second carrier and having the common bandwidth requirement to the first carrier, wherein the second wireless device is added to the one or more MU-MIMO groups upon being determined MU-MIMO eligible.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path~including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format~including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to MU-MIMO performance related to access node 110 and wireless devices 120, 130, 140, selected BWP sizes and identifiers, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
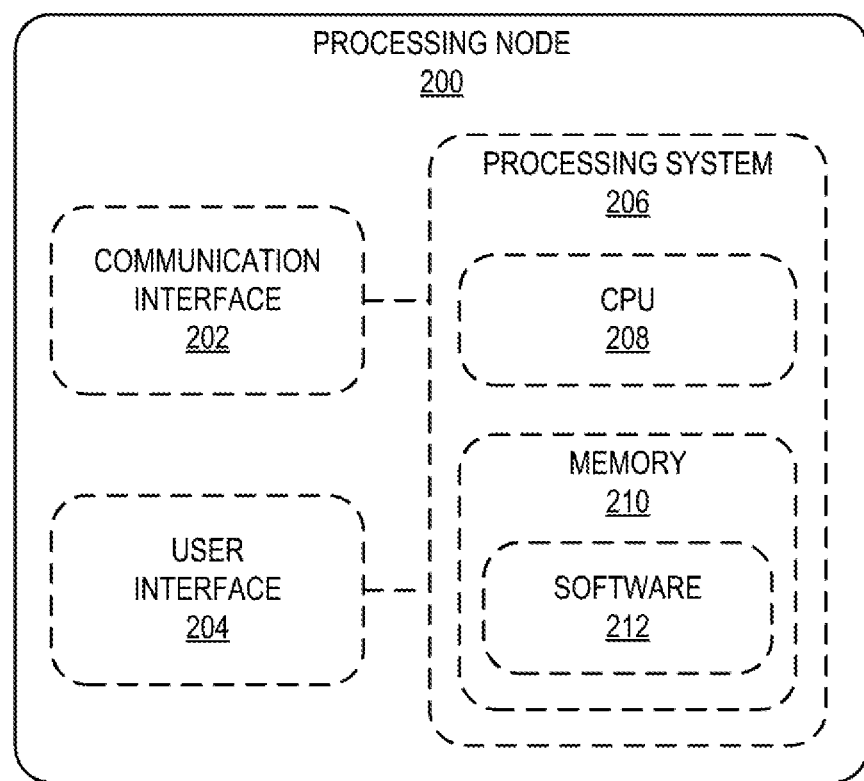
FIG. 2 depicts an exemplary processing node for performing MU-MIMO in wireless networks utilizing different BWPs.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
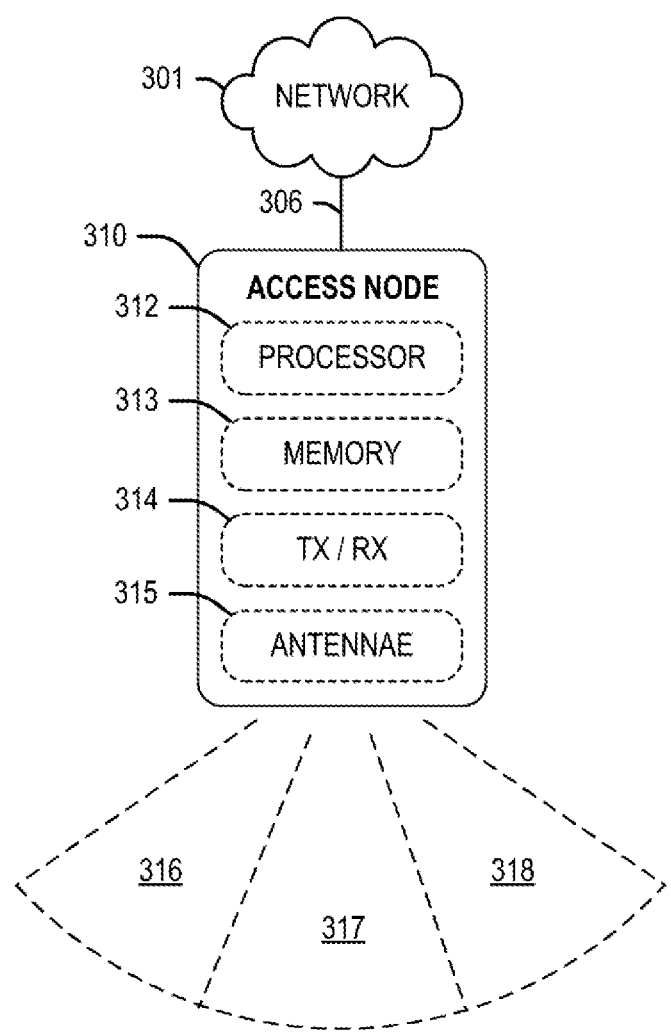
FIG. 3 depicts an exemplary access node for performing MU-MIMO in wireless networks utilizing different BWPs.

FIG. 3 depicts an exemplary access node 310 for performing MU-MIMO in a wireless network. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors 316, 317, 318. Further, in each sector, the antennae 315 may be configured to operate in various operating modes (or transmit data in various transmission mode), such as SU-MIMO, MU-MIMO, beamforming, etc. Similarly, transceivers 314 include a plurality of transceivers that can deploy MU-MIMO or massive MIMO data streams to end-user wireless devices in sectors 316, 317, 318, as well as to facilitate communication with other network nodes on network 301. Further, access node 310 is communicatively coupled to network 301 via communication interface 306, which may be any wired or wireless link as described above.

Figure 4:
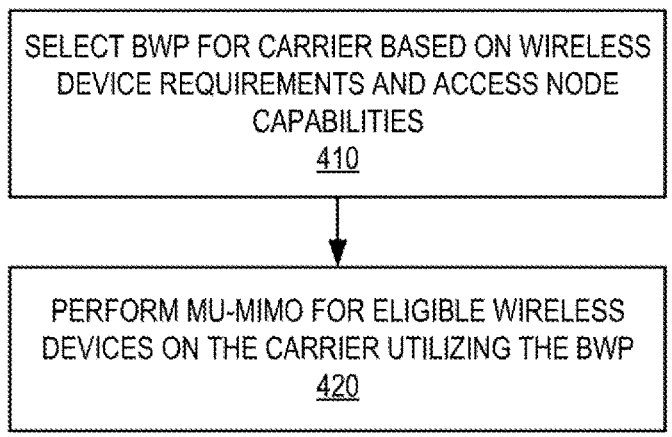
FIG. 4 depicts an exemplary method for performing MU-MIMO in wireless networks utilizing different BWPs.

FIG. 4 depicts an exemplary method for performing MU-MIMO in wireless networks utilizing different BWPs. The method of FIG. 4 is illustrated with respect to an access node, such as access node 110, 310, or a processing node, such as processing node 200. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a BWP is selected (or created) for a carrier deployed by an access node based on a combination of one or more requirements of the wireless devices and one or more capabilities of an access node deploying the first carrier. The one or more requirements of the wireless devices comprise bandwidth requirements, application requirements, or minimum throughput requirements, and the one or more capabilities of the access node comprise a number of antenna elements coupled to the access node, a load of the access node, or an operating frequency of the access node. For example, certain carriers deployed by the access node utilize operating frequencies selected for different applications (such as narrow bandwidth for internet of things devices, millimeter wave for data centers and other high-bandwidth applications), and an optimal or selected BWP for a carrier can be based on the operating frequency of the carrier, along with the other factors mentioned above. In either case, the selected BWP is broadcasted by the access node to all wireless devices within an operating range of the first carrier. In an exemplary embodiment, the BWP is broadcast in a system information block (SIB) message, such as a SIB1 message. For example, a new attribute can be created within a SIB1 message, the new attribute indicating an identifier and a size of the BWP. In an exemplary embodiment, the new attribute comprises BWP-DownlinkPreferred and includes values for a sequence and BWP-ID.

At 420, MU-MIMO is performed for wireless devices attached to the first carrier and utilizing the first BWP. Performing MU-MIMO can include forming MU-MIMO groups comprising eligible wireless devices from among the wireless devices attached to the first carrier and utilizing the first BWP. For example, different wireless devices may be configured to utilize different BWPs depending on a bandwidth requirement (which can be based on device capability, application requirement, etc.), and pairing wireless devices with similar or identical bandwidth requirements can improve MU-MIMO efficiency. Thus, the creation and/or selection of BWPs to which certain wireless devices with common bandwidth requirements can attach can improve the chances of creating successful and efficient MU-MIMO pairings/groups.

Figure 5:
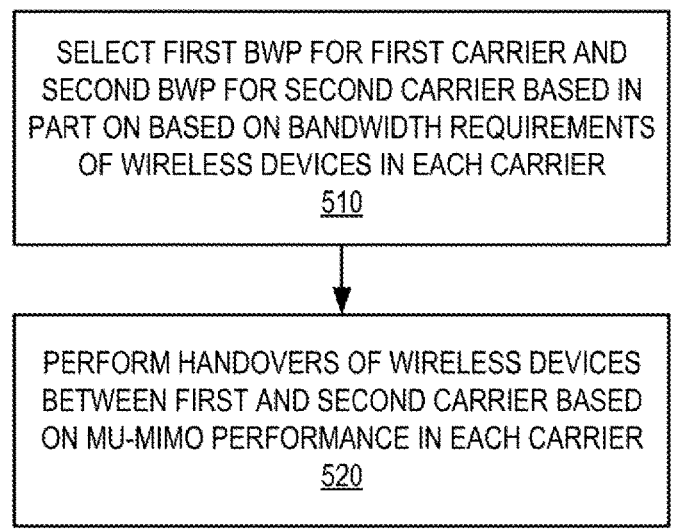
FIG. 5 depicts another exemplary method for performing MU-MIMO in wireless networks utilizing different BWPs.

FIG. 5 depicts another exemplary method for performing MU-MIMO in wireless networks utilizing different BWPs. The method of FIG. 5 is illustrated with respect to an access node, such as access node 110, 310, or a processing node, such as processing node 200. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a first BWP is selected (or created) for a first carrier deployed by an access node and a second BWP is selected (or created) for a second carrier deployed by the access node. The first and second BWPs are selected/created based in part on bandwidth requirements of wireless devices in each carrier. Further, the selected BWP is broadcasted by the access node to all wireless devices within an operating range of the first carrier. In an exemplary embodiment, the BWP is broadcast in a system information block (SIB) message, such as a SIB1 message. For example, a new attribute can be created within a SIB1 message, the new attribute indicating an identifier and a size of the BWP. In an exemplary embodiment, the new attribute comprises BWP-DownlinkPreferred and includes values for a sequence and BWP-ID. In addition, MU-MIMO is performed for wireless devices attached to each carrier and utilizing each BWP. Performing MU-MIMO can include forming MU-MIMO groups comprising eligible wireless devices from among the wireless devices attached to the first carrier and utilizing the first BWP.

At 520, handovers are performed of wireless devices between the first and second carriers and/or BWPs based on the MU-MIMO performance in each carrier. For example, based on the broadcasted BWP, access node can receive handover requests from wireless devices to attach to the identified BWP in the broadcast. In exemplary embodiments, the wireless devices requesting handovers to the identified BWP can include wireless devices attached to a second carrier and able to receive the broadcast on the first carrier. For example, such wireless devices (on any carrier) can have a bandwidth requirement that matches a size of the BWP and, therefore, can request to attach to the BWP. As described herein, such wireless devices can be added to the BWP and, if they meet eligibility criteria for MU-MIMO, can join or form new MU-MIMO groups. The eligibility criteria can include, for example, orthogonality of the wireless devices based on an average signal separation, a size of the sector, an angle of arrival (of, for example, a reference signal), etc. Further, the handovers can be based on a performance of the MU-MIMO groups, which measures how successfully and efficiently the MU-MIMO groups are utilizing the available resources. Based on the performance, handovers may be performed into and out of the BWP and/or the current sector.

Figure 6:
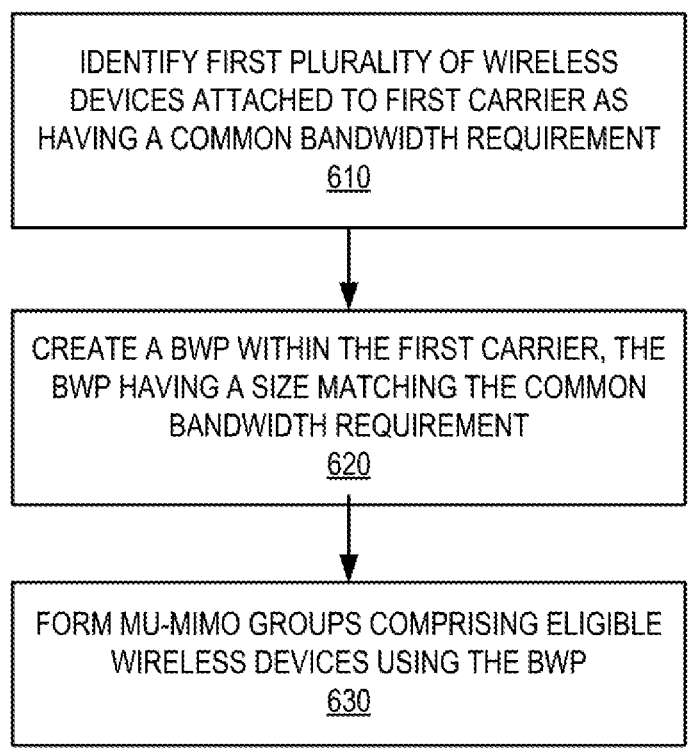
FIG. 6 depicts another exemplary method for performing MU-MIMO in wireless networks utilizing different BWPs.

FIG. 6 depicts another exemplary method for performing MU-MIMO in wireless networks utilizing different BWPs. The method of FIG. 6 is illustrated with respect to an access node, such as access node 110, 310, or a processing node, such as processing node 200. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a first plurality of wireless devices attached a first carrier is identified as having a common bandwidth requirement and, at 620, a BWP is created within the first carrier, the BWP having a size that matches the common bandwidth requirement. The selected BWP is broadcasted by the access node to all wireless devices within an operating range of the first carrier. In an exemplary embodiment, the BWP is broadcast in a system information block (SIB) message, such as a SIB1 message. For example, a new attribute can be created within a SIB1 message, the new attribute indicating an identifier and a size of the BWP. In an exemplary embodiment, the new attribute comprises BWP-DownlinkPreferred and includes values for a sequence and BWP-ID.

Then at 630, MU-MIMO groups are formed, the MU-MIMO groups comprising eligible wireless devices from among the wireless devices attached to the first carrier and utilizing the first BWP. For example, different wireless devices may be configured to utilize different BWPs depending on a bandwidth requirement (which can be based on device capability, application requirement, etc.), and pairing wireless devices with similar or identical bandwidth requirements can improve MU-MIMO efficiency. Thus, the creation and/or selection of BWPs to which certain wireless devices with common bandwidth requirements can attach can improve the chances of creating successful and efficient MU-MIMO pairings/groups.

Figure 7:
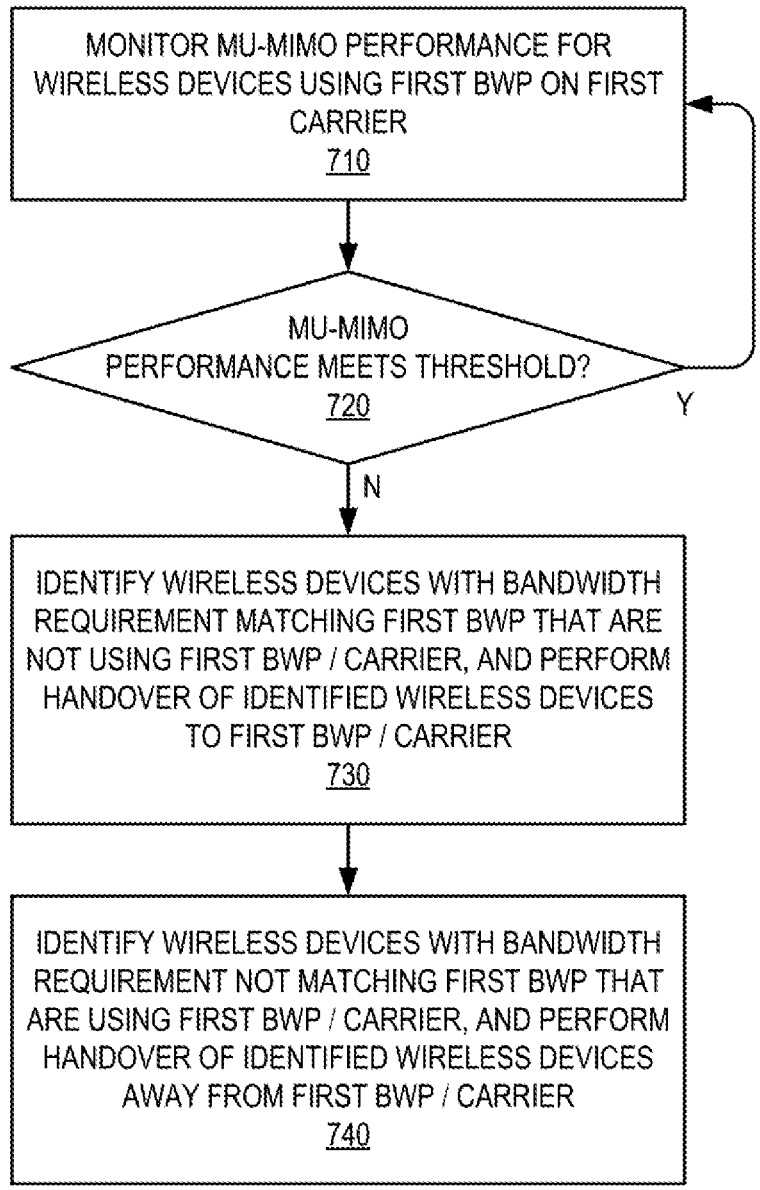
FIG. 7 depicts another exemplary method for performing handovers of wireless devices based on matching bandwidth requirements with BWPs in different carriers.

FIG. 7 depicts another exemplary method for performing handovers of wireless devices based on matching bandwidth requirements with BWPs in different carriers. The method of FIG. 7 is illustrated with respect to an access node, such as access node 110, 310, or a processing node, such as processing node 200. In other embodiments, the method can be implemented with any suitable network element. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, a performance of MU-MIMO groups within can be monitored within a BWP, within a carrier, or within a wireless network. Generally, the performance can be based on one or more of a size of each MU-MIMO group comprising the eligible wireless devices or a quantity of eligible wireless devices participating in the MU-MIMO groups. In an exemplary embodiment, a performance of MU-MIMO can further include a throughput of each of the one or more MU-MIMO groups in the sector, an average throughput of each MU-MIMO group or each wireless device in each MU-MIMO group, or an aggregate throughput (i.e. total throughput) of all MU-MIMO signals within the sector, as well as how many wireless devices within the sector meet an orthogonality threshold, a number of successful pairings, historical trends of the signal characteristics, and so on. For example, the historical trends may be monitored and recorded at time intervals, and the pairing efficiency metric based on the recorded historical trends. Thus, at certain time intervals, the pairing efficiency metric is monitored when adjusting the maximum number of MU-MIMO wireless devices. Generally, the performance tracks how successfully and efficiently the MU-MIMO groups are utilizing the available resources and, at 720, the performance is compared with a threshold. If the threshold is met, the monitoring continues. If, however, the threshold is not met, then additional operations are performed including handovers of wireless devices between first and second BWP/carriers.

For example, at 730, wireless devices with bandwidth requirements matching the first BWP and that are not attached to the first BWP/carrier (or that are attached to a second carrier) are identified, and handovers of the additional wireless devices are performed from the second carrier/BWP to the first carrier/BWP. These wireless devices can be attached to the same access node, or to a different access node (i.e. a neighboring access node, not shown), and within a coverage area of the first access node or carrier, so as to receive the broadcasted BWP and request attaching thereto. Further, identifying the wireless devices capable of utilizing the first BWP is based on the wireless devices having a bandwidth requirement that matches a size of the first BWP.

Further at 740, to improve efficiency of MU-MIMO pairings within the first BWP, any additional wireless devices attached to the first carrier or the first BWP that are not capable of utilizing the first BWP can be handed over to a different carrier or BWP. For example, these additional wireless devices may not share a bandwidth requirement that matches the first BWP. Further, these additional wireless devices may have a bandwidth requirement that matches a different BWP that is used on a different carrier and, thus, a handover of these additional wireless devices may be performed to the different carrier based on the different carrier being configured to deploy the different BWP. This bandwidth requirement may be based on an application requirement, signal type, etc. utilized by the additional wireless devices. Further, the different carrier or BWP may be deployed by the same access node or a different (i.e. neighboring) access node. Thus, multiple access nodes within a wireless network can communicate and perform handovers of wireless devices to maximize the numbers of wireless devices that are eligible for MU-MIMO and that share common bandwidth requirements, so as to maximize resource usage within the wireless network.

Figure 8:
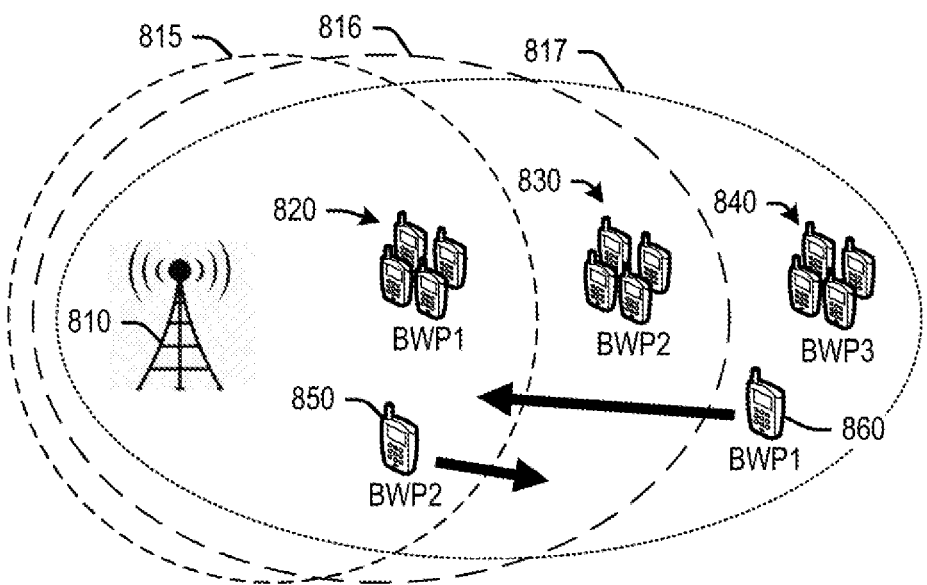
FIG. 8 depicts exemplary handovers of wireless devices based on matching bandwidth requirements with BWPs in different carriers.

FIG. 8 depicts exemplary handovers of wireless devices based on matching bandwidth requirements with BWPs in different carriers. Access node 810 is similar to access nodes 110 and 310, and is configured to deploy at least three carriers 815, 816, and 817, each of which utilizes a different operating frequency. Further, wireless devices 820 are illustrated as being attached to carrier 815 and utilizing BWP1, wireless devices 830 are illustrated as being attached to carrier 816 and utilizing BWP2, and wireless devices 840 are illustrated as being attached to carrier 817 and utilizing BWP3. Each of BWP1, BWP2, and BWP3 may be selected or created based on any combination of operating frequencies of each carrier 815, 816, 817, bandwidth requirements of wireless devices 820, 830, 840, and/or capabilities of access node 810, including number of available antennae, load levels, etc. Thus, access node 810 can be further configured to broadcast a BWP identifier and size in each of carriers 815, 816, 817, using for example a SIB message.

Further, a wireless device 850 may be identified as having a bandwidth requirement that matches BWP2, yet is currently attached to carrier 815. Thus, based on the embodiments described herein, the wireless device 850 may be handed over to another carrier, such as carrier 816, which includes wireless devices 830. For example, wireless devices 830 may be part of one or more MU-MIMO groups that are utilizing BWP2 so as to maximize efficiency of resource utilization by virtue of having a common bandwidth requirement, and inclusion of wireless device 850 into these groups can be more efficient for resource utilization of access node 810. Similarly, wireless device 860 may be identified as having a bandwidth requirement that matches BWP1, yet is currently attached to carrier 817. Thus, wireless device 860 may be handed over to another carrier, such as carrier 815, which includes wireless devices 820. For example, wireless devices 820 may be part of one or more MU-MIMO groups that are utilizing BWP1 so as to maximize efficiency of resource utilization by virtue of having a common bandwidth requirement, and inclusion of wireless device 860 into these groups can be more efficient for resource utilization of access node 810.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing multi-user multiple input multiple output (MU-MIMO) in wireless networks utilizing different bandwidth parts (BWPs), the method comprising:
   selecting a first BWP for a first carrier deployed by a wireless network;
   matching bandwidth requirements of wireless devices attached to the first carrier with a size of the first BWP; and
   forming MU-MIMO groups comprising eligible wireless devices from among the wireless devices having bandwidth requirements that match the size of the first BWP.

2. The method of claim 1, further comprising selecting the first BWP based on a combination of one or more requirements of the wireless devices and one or more capabilities of an access node deploying the first carrier.

3. The method of claim 2, wherein:
   the one or more requirements of the wireless devices comprise bandwidth requirements, application requirements, or minimum throughput requirements, and the one or more capabilities of the access node comprise a number of antenna elements coupled to the access node, a load of the access node, or an operating frequency of the access node.

4. The method of claim 1, further comprising broadcasting the first BWP to all wireless devices within an operating range of the first carrier.

5. The method of claim 4, wherein broadcasting the first BWP further comprises:
creating a new attribute within a system broadcast message; and
broadcasting a size of the first BWP within the new attribute.

6. The method of claim 4, further comprising receiving requests from additional wireless devices attached to a second carrier and capable of utilizing the first BWP to be handed over to the first carrier based on the additional wireless devices receiving the broadcast.

7. The method of claim 1, further comprising determining the eligible wireless devices based on one or more pairing criteria.

8. The method of claim 7, further comprising:
monitoring a performance of the MU-MIMO groups utilizing the first BWP; and
performing handovers of additional wireless devices into and out of the first carrier based on the performance.

9. The method of claim 8, further comprising:
identifying a first additional wireless device attached to a second carrier and capable of utilizing the first BWP; and
performing a handover of the additional wireless device from the second carrier to the first carrier.

10. The method of claim 9, wherein identifying the first additional wireless device capable of utilizing the first BWP is based on the first additional wireless device having a bandwidth requirement that matches a size of the first BWP.

11. The method of claim 8, further comprising:
identifying a second additional wireless device attached to the first carrier and not capable of utilizing the first BWP; and
performing a handover of the second additional wireless device from the first carrier to a second carrier.

12. The method of claim 11, further comprising:
determining that the second additional wireless device is capable of utilizing a second BWP; and
selecting the second carrier based on the second carrier being configured to deploy the second BWP.

13. A system for performing multi-user multiple input multiple output (MU-MIMO) in wireless networks utilizing different bandwidth parts (BWPs), the system comprising:
a processing node; and
a processor coupled to the processing node, the processor being configured to perform operations comprising:
selecting a first BWP for a first carrier deployed by an access node based on any combination of characteristics of the access node and bandwidth requirements of wireless devices attached to the first carrier;
selecting a second BWP for a second carrier deployed by the access node based on any combination of the characteristics of the access node and bandwidth requirements of wireless devices attached to the second carrier;
performing handovers of wireless devices between the first and second carriers based on the matching the bandwidth requirements of the wireless devices with a size of the first and second BWPs.

14. The system of claim 13, wherein the first and second BWPs are selected further based in part on an operating frequency of the first and second carriers respectively.

15. The system of claim 13, wherein the each of the first and second BWPs are selected based on identifying a maximum number of wireless devices attached respectively to the first and second carriers and having a substantially identical bandwidth requirement, and selecting each BWP by matching the size of each BWP with the substantially identical bandwidth requirement.

16. The system of claim 13, further comprising determining one or both of a first number of MU-MIMO groups or a second number of eligible wireless devices participating in MU-MIMO groups in each carrier.

17. The system of claim 16, further comprising:
identifying a first wireless device attached to the first carrier and having a bandwidth requirement matching the second BWP; and
performing a handover of the first wireless device to the second carrier.

18. The system of claim 13, further comprising instructing the wireless devices to request handovers to one of the first and second carriers based on matching the bandwidth requirements of the wireless devices with the first and second BWPs respectively.

19. A processing node for performing multi-user multiple input multiple output (MU-MIMO) in wireless networks utilizing different bandwidth parts (BWPs), the processing node being configured to perform operations comprising:
identifying a first plurality of wireless devices attached to a first carrier as having a common bandwidth requirement;
creating a BWP within the first carrier, wherein a size of the BWP is matched with the common bandwidth requirement; and
forming one or more MU-MIMO groups comprising MU-MIMO eligible wireless devices within the first plurality of wireless devices.

20. The processing node of claim 19, wherein the operations further comprise:
performing a first handover of a first wireless device attached to the first carrier and not having the common bandwidth requirement to a second carrier; and
performing a second handover of a second wireless device attached to the second carrier and having the common bandwidth requirement to the first carrier,
wherein the second wireless device is added to the one or more MU-MIMO groups upon being determined MU-MIMO eligible.

* * * * *